United States Patent [19]
Maher

[11] Patent Number: 5,258,338
[45] Date of Patent: * Nov. 2, 1993

[54] FINE GRAINED BATIO$_3$ POWDER MIXTURE AND METHOD FOR MAKING

[75] Inventor: Galeb H. Maher, North Adams, Mass.

[73] Assignee: MRA Laboratories, North Adams, Mass.

[*] Notice: The portion of the term of this patent subsequent to Apr. 23, 2008 has been disclaimed.

[21] Appl. No.: 919,865

[22] Filed: Jul. 27, 1992

Related U.S. Application Data

[63] Continuation-in-part of Ser. No. 512,267, Apr. 20, 1990, abandoned, which is a continuation-in-part of Ser. No. 463,705, Jan. 11, 1990, Pat. No. 5,010,443.

[51] Int. Cl.$^5$ ............................................. C04B 35/46
[52] U.S. Cl. ..................... 501/137; 501/138; 501/139
[58] Field of Search ..................... 501/137, 138, 139; 361/321

[56] References Cited

U.S. PATENT DOCUMENTS 5,010,443  4/1991  Maher ................................. 361/321

Primary Examiner—Mark L. Bell
Assistant Examiner—Chris Gallo

[57] ABSTRACT

Disc and monolithic (multilayer) ceramic capacitors having a fine grained barium titanate body exhibit a high dielectric constant and a smooth (X7R) temperature coefficient of capacitance. The start ceramic materials for making such capacitors are predominantly spherical barium titanate powder particles of average particle size less than 0.7 micron and of narrow particle size distribution. The barium titanate is mixed with around 2 weight percent of a the cadmium silicate flux, 3Cd.SiO$_2$, serving as a reactivity and sintering promoting agent; and about one weight percent of a reactivity and sintering inhibitor agent, Nb$_2$O$_5$. After preparing a green body of this mixture, the body is sintered at about 1100° C. A powder mixture for manufacture of such capacitors includes mixing powders of the three above-described materials, mildly sintering the powder mixture and if necessary comminuting the calcine to produce a ceramic powder of agglomerates of the start powders, each agglomerate having the same composition as did the precursor mixture. Low firing monolithic ceramic capacitors have been made with 70% Ag 30% Pd buried electrodes and with ten microns thick active ceramic dielectric layers having a dielectric constant (K) of 4800 and a temperature coefficient well within the X7R range.

9 Claims, 1 Drawing Sheet

FINE GRAINED BATIO₃ POWDER MIXTURE AND METHOD FOR MAKING

CROSS REFERENCE TO RELATED APPLICATIONS

This application is a continuation-in-part of my patent application Ser. No. 07/512,267 filed Apr. 20, 1990, now abandoned, that is a continuation in part of my patent application Ser. No. 07/463,705 filed Jan. 11, 1990 that issued as U.S. Pat. No. 5,010,443 on Apr. 23, 1991.

BACKGROUND

This invention relates to a low-temperature sintered dielectric ceramic body compound of fine barium titanate grains and a small amount of cadmium silicate flux, the ceramic body having a high dielectric constant and a smooth temperature coefficient of dielectric constant, especially suitable for use in high quality multilayer ceramic capacitors.

Multilayer ceramic capacitors having a smooth X7R dielectric temperature coefficient comprise a substantial portion of the large ceramic capacitor market. Progress toward better X7R ceramic bodies having higher dielectric constants (K) has been slow. It is a well known contrariness rule that whatever is done to increase the dielectric constant, also degrades the smoothness of the dielectric temperature coefficient, and vise versa. However, a most striking advance that violates that rule has resulted from the discovery that capacitors with ceramic bodies of very fine grains especially around 0.8 micron diameter, tend to have both a higher dielectric constant (K) and at the same time smoother temperature coefficient of capacitance (TCC) compared to large grained (1 micron and larger) ceramic bodies of the same composition.

In multilayer capacitors the fine grain structure has the further advantage that the space between adjacent layers of buried electrodes may be commensurately smaller leading to higher capacitance per unit volume, or lower cost per microfarad. Fine-grained bodies are made by sintering very fine particle (e.g. 0.2 micron) powders having a high surface energy and advantageously sinter at a lower temperature. But for such fine-grained bodies the same old contrariness rule applies. For example, fine-grained bodies of pure barium titanate hot pressed and sintered have K of about 3700 and are far from meeting the X7R specification. To meet this X7R standard the K over the operating temperature range of from $-55°$ C. to $125°$ C. varies no more than 15% relative to the K at room temperature. But, when sintered with 11 wt % of a sintering film ($CdBi_2Nb_2O_9$) at $1130°$ C., the ceramic is densified and easily meets the X7R standard but has a room temperature K of only 1500. Alternatively the addition of 15 wt % of a bismuth titanate flux ($2Bi_2O_3.3TiO_2$) and sintering at $1110°$ C. to achieve full densification yields a K of 500 at room temperature and meets the X7R standard. Using 2½ wt % of an additive composed of $NbO_{2.5}.CoO$ with the pure fine grained barium titanate provided an X7R ceramic body with a K of 3000 but required a sintering temperature of $1300°$ C. These results are reported by Hennings et al in the paper entitled *Temperature-Stable Dielectric Based on Chemically Inhomogeneous BaTiO³*, Journal of the American Ceramics Society, Vol. 67, No. 4, 1984, pages 249-254.

Another well known contrariness rule, exemplified by these examples, is that the addition of a sintering flux to the ceramic start mixture reduces the sintering temperature necessary to achieve densification, and thereby reduces the amount of precious metals needed to prevent the buried electrodes from melting during sintering. The addition of flux also tends to make the temperature coefficient smoother. However, such additions of flux tend to drastically reduce the dielectric constant of the sintered ceramic. This role applies without exception to all dielectric ceramic materials regardless of ceramic grain size.

The capability for being sintered to maturity and high density at low firing temperatures makes it possible to include electrodes of silver and low precious metal content (e.g. Pd) buried in the ceramic during firing. Cost is consequently reduced by the lower temperature in manufacturing and more significantly by the much less expensive electrode materials.

A third contrariness rule is that the addition of a sintering aid or flux melts at sintering providing a medium in which the process of simultaneous dissolution and recrystallization of the ceramic ensues, simultaneously promoting grain growth and thus exacerbating the problem of providing a high dielectric constant and a low TCC. In fact this rule was not at all contrary before only a few years ago when large grains were perceived as a goal toward achieving high dielectric constant ceramics. For example, see U.S. Pat. No. 4,898,844 (Feb. 6, 1990); U.S. Pat. No. 4,266,265 (May 5, 1981); U.S. Pat. No. 4,120,677 (Oct. 17, 1978); U.S. Pat. No. 4,066,426 (Jan. 3, 1978); and U.S. Pat. No. 3,885,941 (May 27, 1975). In the patent U.S. Pat. No. 3,231,799 (Jan. 25, 1966) there is disclosed the use of separate compounds of niobium and tantalum in the start materials to provide a high K body with a smooth temperature coefficient of capacitance (TCC). These and other elements have been recognized as grain growth inhibitors, e.g. as in the above-noted U.S. Pat. No. 4,120,677 (Oct. 17, 1978) and U.S. Pat. No. 4,898,844 (Feb. 6, 1990). The above-mentioned patents with issue dates in parentheses and the patent application are assigned to the same assignee as is the present invention.

Mechanical comminution of ceramic powder particles to reduce particle size becomes ineffective at lower than about 1 micron and particle shapes are jagged and non-spherical. Only recently have methods for making finer powder become known. For example see U.S. Pat. No. 4,654,075 (Mar. 31, 1987), such fine particles made by either the hydrothermal or the emulsion processes are advantageously spherical, have a relatively narrow particle size distribution and have an average particle size that may be varied upward from 0.1 micron in the process of manufacture. Such particles have a very high energy density and therefore will sinter at a lower temperature than larger particles of the same composition. They also are more reactive at sintering with other compounds in a ceramic start material.

It is an object of this invention to provide a ceramic powder mixture for use in manufacturing a high dielectric constant ceramic body sintered at a the low temperature of $1100°$ C., having grains of average size less than 0.9 micron and having a high dielectric constant and a smooth X7R temperature coefficient of the dielectric constant.

SUMMARY

A ceramic powder mixture is comprised of agglomerates that include a group of three kinds of powder particles; namely, very fine barium titanate particles accounting from between 95 to 98 weight percent of the agglomerate, from 1.5 to 2.5 weight percent of a cadmium silicate, and from 0.5 to 1.5 weight percent of a grain growth inhibitor. The mixture of particles in these agglomerates are bound to each other having been mildly calcined and superficially co-reacted at their adjacent surfaces. The very fine barium titanate particles in the agglomerates spherical and have an average diameter of from 0.2 to 0.8 micron. The average agglomerate size may be reduced, e.g. to less than 1.5 microns after the calcining step by comminution.

This invention recognizes that a cadmium silicate sintering aid combined with a fine barium titanate powder with average particle size less than about 0.7 micron and having a small amount of a resistivity inhibitor will during sintering at about 1100° C. exhibit an unexpected synergism leading to an X7R type capacitor with high dielectric constants. In particular, cadmium silicates having a characteristic melting temperature greater than the sintering temperature, will take in some of the barium from the titanate to form a eutectic flux that does melt and serve as a medium in which liquid phase sintering can occur. Furthermore, the silicate fluxes being known to be less reactive than borate fluxes nevertheless have the additional advantage that they apparently form into globules in the more spacious interstices of the grain boundaries unlike the borates that readily wet barium titanate, so that substantially higher dielectric constants result than with the borates in very fine barium titanate ceramics.

The powder of this invention is further characterized and distinguished by evidencing, in capacitors made with this powder, essentially no shift in the Curie temperature of the barium titanate during the sintering step. The opportunity for reaction of the barium titanate with reactivity inhibitor element, e.g. niobium, and with cations in the flux., e.g. cadmium, zinc, bismuth, etc. is thus apparently foregone. Whatever minor reaction of the additives with barium titanate that occurs must be superficial, which is likely due to a limited solubility of this combination of additives in either the flux or in the surfaces of the barium titanate particles. In the prior art, such cations having reacted with the barium titanate during sintering normally cause a shift in the Curie temperature, whereas in the fine sintered powder of this invention, there is essentially no change in the operating temperature at which the dielectric constant peaks, namely at 125° C., advantageously lifting the TCC curve at high capacitor-operating temperatures to within the X7R specified tolerance.

In my above-mentioned patent U.S. Pat. No. 4,266,265, the superiority is demonstrated of the flux $5CdO.2SiO_2$ over the other cadmium silicate flux compositions for use in combination with large grain barium titanates, e.g. of average particle size greater that 1 micron, leading to optimum densities and higher dielectric constants.

Contrariwise it has been found that the use of $3CdO.SiO_2$, from among the cadmium silicates of the prior art, as the sintering promoter in the fine powder mixtures of this invention provide the highest densities in the fired ceramic and the highest dielectric constants. Although this is not understood it is speculated that the lesser amount of silica in $3CdO.SiO_2$, among the other known cadmium silicates, is less stimulating to grain growth of the highly reactive sub-micron particle barium titanate.

The low temperature-firable ceramic powder mixture of this invention makes it possible to manufacture ceramic capacitors having a temperature coefficient meeting the X7R standard with a dielectric constant that is substantially higher than any that were known heretofore.

DESCRIPTION OF THE PREFERRED EMBODIMENTS

Figure 1:
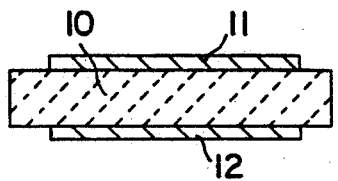
FIG. 1 shows in side sectional view a wafer or disc type ceramic capacitor of this invention.

A number of related experiments were carried out for producing in each case of test capacitors of the disc type as shown in FIG. 1 having a dielectric ceramic body 10 and conductive electrodes on opposite faces of the body 10. The procedure employed in each case entailed forming a mature barium titanate disc or chip of about 35 mils (1.4 mm) thick and forming electrodes on the two opposite major surfaces of the chip. In particular, a slip suspension was prepared by mixing a spherical-particle powder designated herein as BT-3) of essentially pure (99.902 wt %) and highly stoichiometric (1.000+/−0.003 molar ratio) barium titanate, about 1 weight percent of niobium oxide powder, $Nb_2O_5$, and various quantities of a powdered glass sintering flux in an organic vehicle.

The start niobia powder had an average grain size of about 1 micron. The start cadmium silicate powder was made by ball milling cadmium oxide CdO and silica $SiO_2$ with an isopropyl alcohol wetting agent and using high density yttria-stabilized zirconia balls in a polyethylene bottle. The milled powder was then dried and calcined at about 950° C. The resulting calcine was remilled to obtain a calcined powder mixture of average particle size less than 1 micron. The mixing of the start powders in the organic vehicle was accomplished by milling with barium titanate balls for 12 hours in a 200 cc polyethylene container.

The resulting slip was cast on a glass plate using a standard doctor blade technique and after drying, the casting was cut into small squares each about 1×1 cm. The squares were then sintered and after cooling a silver electroding paste was applied to the opposite surfaces of the sintered chip which was subsequently heated to 800° C. to cure the electrodes.

In the first case, Example 1(a) in Tables I and II, the barium titanate used has an average particle size of 1.0 micron (micrometer) and the flux is a cadmium silicate, $5CdO.2SiO_2$, described in the above-mentioned patent U.S. Pat. No. 4,266,267, wherein it was shown to be uniquely effective in a barium lead titanate ceramic. This was attributable to its having a melting point higher than the 1100° C. sintering temperature unlike other sintering aids that melt at a temperature below the sintering temperature to initiate "liquid phase sintering". This flux only melts and initiates liquid phase sintering after substitution of some barium from the ceramic for some cadmium in the flux that reduces its melting point. This substitution takes place initially by solid state diffusion.

This flux is insufficient at 2 weight percent to effect sintering densification when firing at 1100° C. It can be seen that in Table I, Example 1(b) green chips of the same composition were fired at 1120° C. and still the body will not sinter and densify. In Example 2 the amount of cadmium silicate flux is increased to 3 weight percent and fired successfully at 1100° C. A very high room temperature dielectric constant (K) is obtained although the temperature coefficient of capacitance (TCC) is outside the X7R limits of +/−15% over the −55° C. to +125° C. range. But in Example 3 with a 4% addition of cadmium silicate, the K has dropped significantly while the TCC worsened. The drop of K was expected but the substantially less smooth TCC with increasing flux is directly contrary to what the art has taught.

In the four Examples, 4(a) through 6, the same 1 micron barium titanate as in Examples 1(a) through 3 is used, but the flux employed is a cadmium borate. Borate fluxes are known for their greater fluxing efficacy compared with silicate fluxes of the same relative amounts by weight.

Because spherical barium titanate particles are used the relationship between powder surface area (SA) and powder particle diameter (D) in microns follows quite closely the theoretical $SA(gm/m_3) = 1/D$ for barium titanate, and one micron particle powder has a surface area of one meter squared per gram.

In Examples 1(a) through 6, the barium titanate powder was manufactured by a hydrothermal process and the powder particles are substantially spherical. The one micron average diameter, however, is typically the finest of the conventional barium titanates which have irregular and elongated shapes made by calcining, crushing and extensive comminution, e.g. by milling or jet pulverizing. The spherical particle powders will sinter without flux at lower temperature than the conventional comminuted-particles powder of the same size.

However, all of the examples herein employ the manufactured spherical particles powder and thus the use of such manufactured spherical powder of 1.0 micron average size is considered a more meaningful control against which ceramic bodies made with the preferred finer spherical particles described below.

Referring to Example 4(a) in Tables I and II, the 1.5% $(CdO.2ZnO.B_2O_3)$ flux is not enough to sinter the barium titanate at 1100° C. but as shown in Example 4(b) that composition will sinter at 1120° C. and produces a useful X7R dielectric body with a high K of 2650. For this 1 micron $BaTiO_3$ powder the 3% cadmium silicate provided an equivalent 5.4% milligrams (mg) of the glass former oxide ($SiO_2$) for each meter squared of $BaTiO_3$ powder surface area whereas the 1.5% cadmium borate provided just 4.3 milligrams of the boron oxide ($B_2O_3$) for each square meter of $BaTiO_3$ powder surface area. Thus the molar amount of the glass former silicon per square meter of the barium titanate powder surface is 1½ times the molar amount of boron per square meter. Further increases in the amount of cadmium borate flux has almost no effect on dielectric properties as indicated in the data of Examples 5 and 6.

Referring now to Tables III and IV, similar experiments were run again but using barium titanate powder having an average particle diameter of 0.5 micron. In Example 7, 2% of the cadmium silicate flux results in sintering at 1100° C. and produces an excellent X7R material with a high dielectric constant, whereas in Example 1(a) that amount of cadmium silicate with 1 micron barium titanate could not. Slightly more flux in Example 8 slightly degraded dielectric quality. For this finer (0.5 micron) barium titanate powder, the use of cadmium borate flux is far less effective in Examples 9 and 10 in comparison with the cadmium silicate flux in Examples 7 and 8 with 0.5 micron barium titanate.

The cadmium borate with the finer 0.5 micron barium titanate in Examples 9 and 10 is also less effective than it was in Examples 4(b), 5 and 6 using 1.09 micron barium titanate. But surprisingly, quite the reverse is true of the combination of the fine 0.5 micron barium titanate and cadmium silicate of Examples 7 and 8 compared to cadmium silicate with 1.0 micron barium titanate of Examples 2 and 3.

In Examples 11, 12, 13 and 14 a zinc silicate was used as the flux. The densification achieved at 1100° C. in Examples 11 and 12 is substantially less than for cadmium containing flux used in Examples 7 through 10. Therefore, the firing temperature was increased to 1125° C. in Examples 13 and 14, giving up some of the advantages of the lower sintering temperature, e.g. less palladium needed in palladium-silver alloy buried electrodes in a monolithic capacitor. Some improvement in dielectric density and dielectric constant was so obtained by the TCC takes these parts well outside the X7R standard range.

It is postulated however, that in future applications wherein cadmium is prohibited, these compositions using zinc silicate as the flux will be useful, especially if they were to contain less than 1½% zinc silicate and fired at near 1200° C. That might be expected to yield an X7R part with the desired high density and high dielectric constants. However, such high firing temperatures for monolithic ceramic capacitors would require the use of an expensive electrode of over 50% palladium. Powder compositions 9 through 14 are not within the scope of this invention.

The use of lead compounds such as the oxide or the zirconate as used in the above-mentioned U.S. Pat. No. 4,266,265 is to be avoided because some of the lead of the high firing ceramics will be taken in by the $3CdO.SiO_2$ flux leading to large changes in the flux eutectic point and further promoting grain growth of the high firing ceramic component and making it difficult to control grain growth. For these reasons the function of lead, in combination with fine pure barium titanate, a grain-growth inhibitor, and $3CdO.SiO_2$, is believed detrimental to predictable and reproducible X7R performance characteristics. Thus lead should be excluded from this composition except in small well controlled amounts, e.g. less than 2 weight percent of the barium titanate.

The density of pure barium titanate is 6.02 m/cc, and the densities achieved in examples of the tables for which cadmium silicate flux is used is seen to be at least 95% of the maximum theoretical density of barium titanate alone.

In Examples 15 through 18 for which data appears in Tables V and VI cadmium silicate flux is combined with barium titanate powders of different average particle size ranging from 1 micron down to 0.3 micron. All were sintered at 1100° C. and for 1 micron barium titanate 3 weight percent flux was required to effect sintering while the rest used 2 weight percent flux. Only with 0.7 micron and 0.4 micron barium titanate was X7R dielectric material produced. Both the largest BaTiO$_3$ particles powder (Example 15) and the smallest (Example 18) yielded ceramics with less smooth TCC than required by the X7R standard.

It seems remarkable that the fine BaTiO$_3$ of Example 18 sintered at all considering that the glass former oxides (SiO$_2$) in the cadmium silicate flux amounts to only 1 mg/m$_2$ coverage while in Example 15, the cadmium silicate flux is just barely enough to effect sintering at 1100° C. and provides particle-surface-area coverage of 2.5 gm/m$^2$.

Referring to the similar Examples 19 through 22, Tables VII and VIII, two weight percent cadmium borate is employed instead of the cadmium silicate of Examples 16–18. The molar amount per BaTiO$_3$ surface area of the glass former silicon in combination with the fine barium titanate powders in Examples 16–18 is essentially identical to the molar amount of boron per surface area in Examples 20–22 using the same fine powder barium titanate. The cadmium silicate consistently provided a higher dielectric constant than cadmium borate with fine BaTiO$_3$.

The explanation noted above and in U.S. Pat. No. 4,266,265 for the unique advantages realized by combining high melting cadmium silicate fluxes with conventional comminuted one micron barium titanate or barium lead titanate, is also appropriate for explaining in part the efficacy disclosed here of cadmium silicate combined with finer barium titanate powder. However, it does not explain why cadmium borate that melts at temperatures well below the sintering temperatures used here, provides excellent results in combination with one micron barium titanate but distinctly less good results than cadmium silicate when combined with barium titanate powders of finer particle size.

This can be partly explained, it is believed, by the fact that the wetability of borate fluxes on barium titanate particle surfaces at sintering is much greater than for cadmium silicate. With fine barium titanate powders wherein the amount of the glass former is little relative to the large surface area of the barium titanate, a skin of borate flux is left covering most of the titanate surfaces reducing the overall dielectric constant of the ceramic; whereas cadmium silicate balls up in the larger pockets of the grain boundaries leaving more direct contact between adjacent particles resulting in a higher dielectric constant.

This explanation is also conditioned upon the use of a reactivity inhibitor, such as Nb$_2$O$_5$, Ta$_2$O$_5$, Bi$_2$O$_3$, TiO$_2$, and the titanates of Nb, Ta and Bi, because only when such an inhibitor is used will the grains remain small at sintering and the surface area of the barium titanate grains will remain large. It may also be noted that from curve 30 the Curie temperature is about 125° C., the same as that of the start BaTiO$_3$ powder.

Referring now to Tables IX and X, similar disc test capacitors, using the same BT-3 start BaTiO$_3$, were made wherein additional cadmium silicate flux compositions are shown for Examples 23, 24, 25 and 27. In Example 26 the same 5CdO.2SiO$_2$ flux composition was used as in Example 7 herein and as was preferred as optimum in my above-mentioned U.S. Pat. No. 4,266,265 so that Example 26 appropriately serves as a control. All the cadmium silicate fluxes of Examples 23 through 27 had an average particle size of 0.5 micron.

The cadmium silicate composition 3CdO.SiO$_2$ is clearly more effective than 5CdO.2SiO$_2$ and the other fluxes in combination with sub-micron spherical-particle BaTiO$_3$ powder, contrary to the finding in U.S. Pat. No. 4,266,265 wherein 5CdO.2SiO$_2$ was found superior in combination with large non-spherical-particle BaTiO$_3$ powder.

Some experimental capacitors, Examples 28 through 31 and 34 employed a start barium titanate powder, designated herein as BT-13, which is 99.964% pure and the molar barium to titanium ratio is 1.001. The powder particles are spherical, and the average particle size is 0.5 micron. The particle size distribution is quite narrow as judged from SEM photographs, namely 95% of the particles having diameters within 0.4 and 0.6 micron.

The capacitors of examples 28 through 31 are disc capacitors. The start mixtures include varying amounts of stoichiometry-adjusting titania and baria as shown in Table XI to determine their effect upon the sintered dielectric properties in a capacitor. Measurements of properties of these four sets of disc capacitors is shown in Table XII. The capacitors of Example 28 have no stoichiometry-adjusting additives and exhibit the highest dielectric constant. The addition of titania in Example 29 degrades density, dielectric constant, DF and the TCC is outside the standard X7R limits (+/−15%). Additions of baria in Example 30 and 31 degrade dielectric constant, and Example 31 has a high DF and is outside the X7R limits.

Thus for optimum performance, the powder mixture is preferably exactly stoichiometric in barium and titanium. From these data it is concluded that any excess baria or titania should not exceed 0.3 weight percent and preferably should not exceed 0.2 weight percent to achieve optimum performance characteristics after sintering to form a capacitor dielectric body.

It is conventional to add about 0.05 weight percent of a manganese compound, e.g. manganese carbonate, to dielectric ceramic compositions to improve life test performance. In other experiments such manganese additions to the compositions of Examples 23 and 34 have provided the expected beneficial result without affecting the TCC or the dielectric constant of the ceramic bodies.

Monolithic test capacitors of Examples 32, 33 and 34, have the same start ingredients, shown in Table XIII, as those of the disc capacitors respectively of Examples 23, 23 and 28. The barium titanate start powder is mixed with the 3CdO.SiO$_2$ flux and the Nb$_2$O$_5$ inhibitor in an organic vehicle and binder medium of turpentine. The organic vehicle consisted of xylene and amyl alcohol in a 70/30 weight ratio respectively. The binder was a poly vinyl butyrol. This slurry contained by weight 50% of the solvent (the vehicle), 9% binder, a few percent organic dispersant and plasticizer, and the mixture of start ceramic powders. The slurry was milled for about six hours to assure homogeneity of the start powders.

Figure 2:
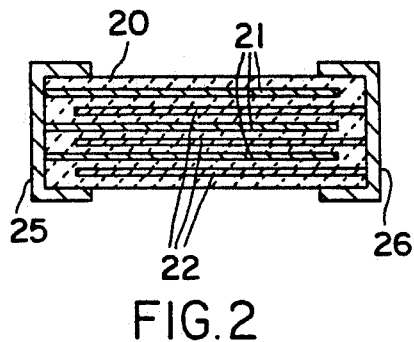
FIG. 2 shows in side sectional view a monolithic or multilayer ceramic capacitor (MLC) of this invention.

In the process for making monolithic capacitors, successive coatings of the milled slurry were applied over a glass substrate, drying each layer in turn and screen printing an electroding paste of 70% silver and 30% palladium to the cast dried layer. Before applying the next successive dielectric layer, the underlying screened pattern of electroding paste was dried. The body 20, as shown in FIG. 2 with buried electrodes 21 and 22, was cut from the stack and was fired to maturity in a closed crucible at 1100° C. for 2½ hours.

Added to this process only in the case of the capacitors of Example 34 was an annealing step, performed after firing in a closed crucible at 1100° C. for 3 hours. The anneal was conducted in open air at 1050° C. for 2 hours with the purpose of removing any free cadmium that may yet remain in the grain boundaries. A silver paste was then applied to either end of body 20 at which edges of the buried electrodes were exposed, and the body was fired at 750° C. for a few minutes to form silver terminations 25 and 26.

In monolithic capacitors having thin active dielectric layers e.g. less than 20 microns, the annealing step is especially effective toward further densification of the ceramic body and causes about a five percent increase in the dielectric constant with no significant change in the TCC. The anneal also provides improved life test performance that is most effective in monolithic capacitors with thin active dielectric layers, e.g. less than 20 microns.

uted particle size of the start barium titanate and partly attributable to the annealing step having further increased the density of the ceramic body to nearly the theoretical limit of barium titanate alone. Dielectric constants of this magnitude in a sintering-flux-containing low temperature-firable X7R body are unheard of in the prior art.

TABLE I

| Example No. | Start BaTiO$_3$ Av. Grain Size (microns) | Flux (wt %) | Reactivity Inhibitor Nb$_2$O$_5$ (wt %) | Sintering Temp. (°C.) | Density (gm/cc) |
|---|---|---|---|---|---|
| 1. (a) | 1.0 | (2%)5CdO.2SiO$_2$ | 1.0 | 1100 | Porous |
| (b) | 1.0 | (2%)5CdO.2SiO$_2$ | 1.0 | 1120 | Porous |
| 2. | 1.0 | (3%)5CdO.2SiO$_2$ | 1.0 | 1100 | 5.830 |
| 3. | 1.0 | (4%)5CdO.2SiO$_2$ | 1.0 | 1100 | 5.877 |
| 4. (a) | 1.0 | (1.5%)CdO.2ZnO.B$_2$O$_3$ | 1.0 | 1100 | Porous |
| (b) | 1.0 | (1.5%)CdO.2ZnO.B$_2$O$_3$ | 1.0 | 1120 | 5.807 |
| 5. | 1.0 | (2%)CdO.2ZnO.B$_2$O$_3$ | 1.0 | 1100 | 5.629 |
| 6. | 1.0 | (2.5%)CdO.2ZnO.B$_2$O$_3$ | 1.0 | 1100 | 5.804 |

TABLE II

| Example No. | Dielectric Constant K @ 25° C. (K) | D.F. (%) | TCC @ −55° C. (% K) | TCC @ +125° C. |
|---|---|---|---|---|
| 1. (a) | n.d. | n.d. | n.d. | n.d. |
| (b) | n.d. | n.d. | n.d. | n.d. |
| 2. | 3980 | 1.26 | −22 | +15 |
| 3. | 2330 | 1.65 | −45 | +64 |
| 4. (a) | n.d. | n.d. | n.d. | n.d. |
| (b) | 2650 | 0.61 | −9 | +7 |
| 5. | 2660 | 0.54 | −9 | +11 |
| 6. | 2560 | 0.57 | −9 | +6 |

TABLE III

| Example No. | Start BaTiO$_3$ Av. Grain Size (microns) | Flux (wt %) | Reactivity Inhibitor Nb$_2$O$_5$ (wt %) | Sintering Temp. (°C.) | Density (gm/cc) |
|---|---|---|---|---|---|
| 7. | 0.5 | (2%)5CdO.2SiO$_2$ | 1.0 | 1100 | 5.841 |
| 8. | 0.5 | (2.5%)5CdO.2SiO$_2$ | 1.0 | 1100 | 5.878 |
| 9. | 0.5 | (1.5%)CdO.2ZnO.B$_2$O$_3$ | 1.0 | 1100 | 5.800 |
| 10. | 0.5 | (2%)CdO.2ZnO.B$_2$O$_3$ | 1.0 | 1100 | 5.862 |
| 11. | 0.5 | (2%)3ZnO.SiO$_2$ | 1.0 | 1100 | 5.65 |
| 12. | 0.5 | (1.5%)3ZnO.SiO$_2$ | 1.0 | 1100 | 5.71 |
| 13. | 0.5 | (2%)3ZnOSiO$_2$ | 1.0 | 1125 | 5.90 |
| 14. | 0.5 | (1.5%)3ZnO.SiO$_2$ | 1.0 | 1125 | 5.81 |

Figure 3:
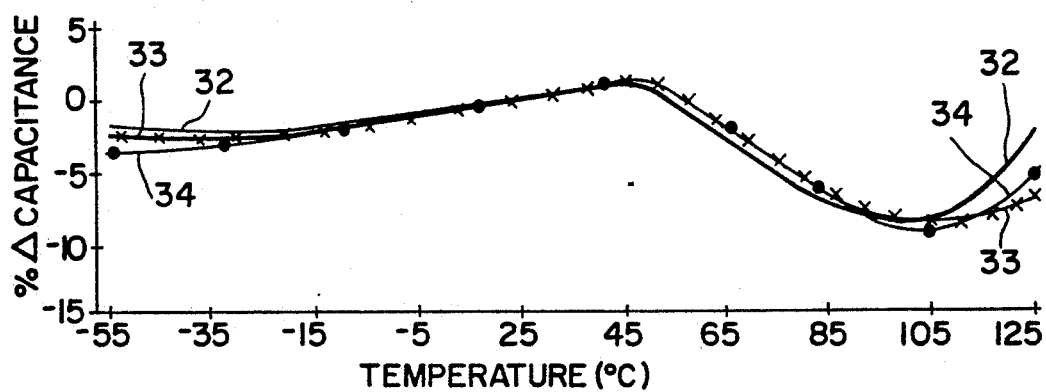
FIG. 3 shows plots of dielectric constant (K) as a function of capacitor operating temperature for two groups of monolithic ceramic capacitors of this invention.

The monolithic capacitors of Examples 32, 33 and 34 are shown in Table XIV. Curves 32, 33 and 34 in FIG. 3 show the almost identical temperature coefficients of capacitance (TCC's) for all three monolithic capacitors, which TCC's are well within the narrow X7R limits.

In the test capacitors of Example 32, the distance between adjacent buried electrodes is 0.4 mil (10.2 microns). In other experiments not reported here using the same materials and process have yielded excellent X7R monolithic capacitors incorporating down to 0.2 mil (5.1 microns) spacing between adjacent electrodes, illustrating the capability of this powder for manufacturing monolithic capacitors of exceptionally large volt-microsecond products per unit volume and therefore physically small and low cost capacitors for a given X7R capacitor performance specification. This capability for forming very thin active dielectric layers in combination with the exceptionally high dielectric constants achievable using the powder mixture of this invention leads to an even greater reduction in size and cost for any given X7R capacitor performance criteria.

The even greater dielectric constant of capacitors of Example 34 is attributable to the more narrowly distrib-

TABLE IV

| Example No. | Dielectric Constant K @ 25° C. (K) | D.F. (%) | TCC @ −55° C. (% K) | TCC @ +125° C. |
|---|---|---|---|---|
| 7. | 3090 | 0.45 | −10 | +10 |
| 8. | 2970 | 0.50 | −11 | +8 |
| 9. | 2480 | 0.46 | −11 | +6 |
| 10. | 2360 | 0.48 | −10 | −4 |
| 11. | 2880 | 0.72 | −18 | −5 |
| 12. | 3080 | 0.72 | −16 | −1 |
| 13. | 3380 | 0.80 | −26 | −13 |
| 14. | 3600 | 0.82 | −20 | −3 |

TABLE V

| Example No. | Start BaTiO$_3$ Av. Grain Size (microns) | Flux 5CdO.2SiO$_2$ (wt %) | Reactivity Inhibitor Nb$_2$O$_5$ (wt %) | Sintering Temp. (°C.) | Density (gm/cc) |
|---|---|---|---|---|---|

TABLE V-continued

| | | | | | |
|---|---|---|---|---|---|
| 15. | 1.0 | 2.0 | 1.0 | 1100 | 5.830 |
| 16. | 0.7 | 2.0 | 1.0 | 1100 | 5.760 |
| 17. | 0.4 | 2.0 | 1.0 | 1100 | 5.763 |
| 18. | 0.3 | 2.0 | 1.0 | 1100 | 5.760 |

TABLE VI

| Example | Dielectric Constant K @ 25° C. | D.F. (%) | TCC @ −55° C. (%) | @ +125° C. (%) |
|---|---|---|---|---|
| 15. | 3980 | 1.26 | −22 | +15 |
| 16. | 2580 | 0.44 | −7 | +13 |
| 17. | 2690 | 0.63 | −12 | +10 |
| 18. | 1800 | 0.47 | −16 | −17 |

TABLE VII

| Example No. | Start BaTiO$_3$ Av. Grain Size (microns) | Flux CdO.2ZnO.B$_2$O$_3$ (wt %) | Reactivity Inhibitor Nb$_2$O$_5$ (wt %) | Sintering Temp. (°C.) | Density (gm/cc) |
|---|---|---|---|---|---|
| 19. | 1.0 | 2.0 | 1.0 | 1100 | 5.583 |
| 20. | 0.7 | 2.0 | 1.0 | 1100 | 5.700 |
| 21. | 0.4 | 2.0 | 1.0 | 1100 | 5.650 |
| 22. | 0.3 | 2.0 | 1.0 | 1100 | 5.673 |

TABLE VIII

| Example No. | Dielectric Constant K @ 25° C. | D.F. (%) | TCC @ −55° C. (%) | @ +125° C. (%) |
|---|---|---|---|---|
| 19. | 2645 | 0.54 | −7 | +12 |
| 20. | 2190 | 0.50 | −10 | +8 |
| 21. | 2110 | 0.62 | −12 | +8 |
| 22. | 1620 | 0.65 | −19 | +14 |

TABLE IX

| Example No. | Start BaTiO$_3$ Av. Grain Size (microns) | Flux (wt % and composition) | Reactivity Inhibitor Nb$_2$O$_5$ (wt %) | Sintering Temp. (°C.) | Density (gm/cc) |
|---|---|---|---|---|---|
| 23. | 0.5 | (2%)3CdO.SiO$_2$ | 1.0 | 1100 | 5.87 |
| 24. | 0.5 | (2%)2CdO.ZnO.SiO$_2$ | 1.0 | 1100 | 5.75 |
| 25. | 0.5 | (2%)CdO.2ZnO.SiO$_2$ | 1.0 | 1100 | 5.81 |
| 26. | 0.5 | (2%)5CdO.SiO$_2$ | 1.0 | 1100 | 5.87 |
| 27. | 0.5 | (1.5%)3CdO.SiO$_2$ | 1.0 | 1100 | 5.83 |

TABLE X

| Example No. | Dielectric Constant K @ 25° C. | D.F. (%) | TCC @ −55° C. (%) | TCC @ +105° C. (%) | TCC @ +125° C. (%) |
|---|---|---|---|---|---|
| 23. | 3600 | 0.98 | −12 | +3 | +14 |
| 24. | 3000 | 0.93 | −15 | −3 | +9 |
| 25. | 2900 | 0.94 | −15 | −3 | +8 |
| 26. | 3400 | 0.98 | −12 | +2 | +15 |
| 27. | 3150 | 0.94 | −11 | +1.4 | +13 |

TABLE XI

| Example No. | Start BaTiO$_3$ Av. Grain Size (microns) | Flux 3CdO.SiO$_2$ (wt %) | Reactivity Inhibitor Nb$_2$O$_5$ (wt %) | BaO (wt %) | TiO$_2$ (wt %) |
|---|---|---|---|---|---|
| 28. | 0.5 | 2% | 1.0 | 0.00 | 0.00 |
| 29. | 0.5 | 2% | 1.0 | 0.00 | 0.40 |
| 30. | 0.5 | 2% | 1.0 | 0.33 | 0.00 |
| 31. | 0.5 | 2% | 1.0 | 0.66 | 0.00 |

TABLE XII

Disc Capacitors

| Example No. | Density (gm/cm$^3$) | Dielectric Constant K @ 25° C. | D.F. (%) | TCC @ −55° C. (%) | TCC @ +105° C. (%) | TCC @ +125° C. (%) |
|---|---|---|---|---|---|---|
| 28. | 5.869 | 3800 | 0.9 | −10 | −1 | +12 |
| 29. | 5.654 | 2600 | 4.0 | −11 | +7 | +23 |
| 30. | 5.891 | 3300 | 0.7 | −6 | 0 | +12 |
| 23. | 5.805 | 2360 | 10.0 | −11 | +5 | +2 |

TABLE XIII

Monolithic Capacitors

| Example No. | Start BaTiO$_3$ Av. Grain Size (microns) | Active Dielectric thickness (microns) | No Active Dielectric layers | Flux 3CdO.SiO$_2$ (wt %) | Reactivity Inhibitor Nb$_2$O$_5$ (wt %) | Density (gm/cc$_3$) |
|---|---|---|---|---|---|---|
| 32. | 0.5 | 10 | 4 | 2% | 1 | 5.81 |

TABLE XIII-continued

| Monolithic Capacitors | | | | | | |
|---|---|---|---|---|---|---|
| 33. | 0.5 | 23 | 9 | 2% | 1 | 5.92 |
| 34. | 0.5 | 15 | 9 | 2% | 1 | 6.087 |

TABLE XIV

| | Dielectric Constant | | TCC (%) | | |
|---|---|---|---|---|---|
| K) Example No. | K @ 25° C. | D.F. (%) | @ −55° C. | @ +105° C. | @ +125° C. |
| 32. | 3460 | 2.3 | −2 | −9 | −3 |
| 33. | 3900 | 2.4 | −3 | −9 | −7 |
| 34. | 4800 | 2.7 | −4 | −10 | −5 |

What is claimed is:

1. A method for making a ceramic powder mixture comprising:
   a) combining from 95 to 98 weight percent of essentially pure and stoichiometric barium titanate powder of spherical particles with average particle size from 0.2 to 0.7 micron, from 1.5 to 2.5 weight percent of a powdered sintering aid composed of $3CdO.SiO_2$, and from 0.5 to 1.5 weight percent of a powdered grain-growth inhibitor powder,
   b) mixing said combined powders to form a homogenous powder mixture; and
   c) partially calcining said homogeneous mixture at approximately 700° C. to obtain a powder comprised of agglomerates of said homogeneous powder mixture wherein each of said agglomerates has essentially the same composition of barium titanate, cadmium silicate and grain-growth inhibitors as in said combined powders,
   to provide a powder mixture capable of being formed into a body that can be fired to maturity at 1100° C., which matured body has a high dielectric constant greater than 4000 and an X7R temperature coefficient of dielectric constant.

2. The method of claim 1 wherein said grain growth inhibitors are selected from the oxides of niobium, tantalum, bismuth and titanium, and bismuth titanate.

3. The method of claim 1 additionally comprising comminuting said calcined powder to produce a free flowing powder having an average agglomerate size of about 1 micron.

4. A ceramic powder mixture comprised of agglomerates, each of said agglomerates comprising a group of three kinds of powder particles having been partially calcined and superficially co-reacted to bind said group of powder particles together to form said each agglomerates, said three kinds of powder particles in said each agglomerates comprising from 95 to 98 weight percent of a barium titanate powder having an average particle size between 0.2 and 0.7 micron, from 1.5 to 2.5 weight percent of powdered $3CdO.SiO_2$ and from 0.5 to 1.5 weight percent of a grain-growth inhibitor powder.

5. The ceramic powder mixture of claim 4 wherein 95 percent of said barium titanate powder particles have a size ranging from 0.8 to 1.2 of said average size providing thus a narrow distribution of particle sizes.

6. The ceramic powder mixture of claim 4 wherein said grain-growth inhibitors are selected from the oxides of niobium, tantalum, bismuth and titanium and from bismuth titanate.

7. The ceramic powder mixture of claim 4 wherein the average agglomerate size is about 1 micron.

8. The ceramic powder mixture of claim 4 wherein said barium titanate particles are essentially spherical.

9. A method for making a dielectric ceramic body comprising:
   a) combining from 95 to 98 weight percent of essentially pure and stoichiometric barium titanate powder of spherical particles with average particle size from 0.2 to 0.7 micron, from 1.5 to 2.5 weight percent of a powdered sintering aid composed of $3CdO.SiO_2$, and from 0.5 to 1.5 weight percent of a powdered grain-growth inhibitor powder:
   b) mixing said combined powders to form a homogenous powder mixture;
   c) partially calcining said homogeneous mixture at approximately 700° C. to obtain a powder comprised of agglomerates of said homogeneous powder mixture wherein each of said agglomerates has essentially the same composition of barium titanate, cadmium silicate and grain-growth inhibitors as in said combined powders;
   d) forming a body of said calcined powder mixture;
   e) sintering said body at 1100° C. in a closed container; and
   f) annealing said body at about 1050° C. in an air atmosphere.

* * * * *